United States Patent [19]
Conn et al.

[11] Patent Number: 5,450,666
[45] Date of Patent: Sep. 19, 1995

[54] FLUX COMPOSITION FOR ALUMINUM BRAZING

[75] Inventors: Paul J. Conn, Grand Island; William J. Schrameck, East Amherst, both of N.Y.

[73] Assignee: S.A. Day Mfg. Co., Inc., Buffalo, N.Y.

[21] Appl. No.: 203,012

[22] Filed: Feb. 28, 1994

[51] Int. Cl.$^6$ .................... B23K 35/363; B23K 101/14
[52] U.S. Cl. .................... 29/890.043; 228/223; 228/183; 148/23; 29/890.054
[58] Field of Search .................... 228/223, 183; 148/26, 148/23; 29/890.043, 890.046, 890.054

[56] References Cited

U.S. PATENT DOCUMENTS

| | | | |
|---|---|---|---|
| 2,806,808 | 9/1957 | Muetzel | 148/23 |
| 2,847,338 | 8/1958 | Morrison | 148/23 |
| 3,951,328 | 4/1976 | Wallace et al. | 228/207 |
| 3,971,501 | 7/1976 | Cooke | 228/248 |
| 5,180,098 | 1/1993 | Halstead et al. | 228/183 |
| 5,226,974 | 7/1993 | Conn | 148/23 |
| 5,242,669 | 9/1993 | Flor | 423/465 |
| 5,251,374 | 10/1993 | Halstead et al. | 29/890.047 |

*Primary Examiner*—Mark Rosenbaum
*Assistant Examiner*—Jeffrey T. Knapp
*Attorney, Agent, or Firm*—Gary M. Hartman; Domenica N. S. Hartman

[57] ABSTRACT

An improved flux composition is provided which is formulated for use in the brazing of aluminum alloy components, such as in the assembly of brazed heat exchanger units used in automotive applications. The flux composition is in a concentrated form, permitting its selective application to the joint surfaces of a heat exchanger's subcomponents, and contains a flux material which consists essentially of potassium tetrafluoroaluminate, a carrier system such as a glycerol-ethylene glycol system, a binder, and a liquid medium such as water. Most preferably, the potassium tetrafluoroaluminate constitutes at least about 96 percent of the flux material, and the binder is xanthan which substantially prevents the flux composition from separating during storage. The flux composition does not contain potassium aluminum fluoride. The flux composition also makes possible a method for forming a brazed heat exchanger assembly, in which the use of a clad brazing stock material for the components of the heat exchanger can be minimized or eliminated through the use of a brazing alloy preform.

20 Claims, 2 Drawing Sheets

FLUX COMPOSITION FOR ALUMINUM BRAZING

The present invention relates to flux compositions used when joining aluminum alloy components, such as during the assembly of a heat exchanger of the type used as engine radiators and air conditioning condensers. More particularly, this invention relates to an improved flux composition which is characterized by being in a concentrated form that is highly stable over time and does not generate corrosive byproducts during the brazing operation. This invention also relates to methods for using the novel flux composition.

BACKGROUND OF THE INVENTION

Heat exchangers are employed within the automotive industry as radiators for cooling engine coolant, condensers and evaporators for use in air conditioning systems, and heaters. In order to efficiently maximize the amount of surface area available for transferring heat between the fluid within the heat exchanger and the environment, the design of the heat exchanger is typically of a tube-and-fin type containing a multitude of tubes which thermally communicate with high surface area fins. The fins enhance the ability of the heat exchanger to transfer heat from the fluid to the environment, or vice versa. Heat exchangers used in the automotive industry are often formed from aluminum alloys in order to help reduce the weight of automobiles.

Heat exchangers are increasingly being formed by a brazing operation in which the individual components of the heat exchanger are permanently joined together with a brazing alloy. Generally, brazed heat exchangers are lower in weight and are better able to radiate heat as compared to heat exchangers formed by known mechanical assembly techniques. An example of a brazed heat exchanger is of the serpentine tube-and-center (STC) type, which is characterized by one or more serpentine-shaped tubes that are brazed to a number of high surface area finned centers, with an inlet and outlet being located at opposite ends of the tube or tubes. Another type of heat exchanger is the headered tube-and-center (HTC) type, which utilizes a number of parallel tubes which are brazed to and between a pair of headers, with finned centers being brazed between each adjacent pair of tubes. Conventionally, headered tube-and-center type heat exchangers have been constructed by inserting the parallel tubes into apertures formed in each of an opposing pair of headers. A finned center is then positioned between each adjacent pair of parallel tubes. Tanks are formed at each header so as to be in fluidic communication with the tubes through the apertures. The tanks include ports which serve as an inlet and outlet to the heat exchanger.

The above individual components are fixtured together before undergoing a furnace brazing operation that forms numerous brazements which permanently join the components to form a heat exchanger assembly. Generally, the brazements are achieved by forming the headers and the finned centers from an aluminum alloy brazing stock material composed of an aluminum-base brazing alloy layer which is clad on at least one surface of an aluminum alloy core. Typically, the brazing alloy is an aluminum-silicon eutectic alloy, such as AA 4045, AA 4047 and AA 4343 aluminum alloys (AA being the designation given by the Aluminum Association), which has a melting point that is lower than the core alloy, which is often AA 3003. The brazing operation involves raising the temperature of the assembly such that only the clad layers of brazing alloy melt during the brazing operation. Upon melting, the brazing alloy flows toward the desired joint regions and, upon cooling, solidifies to form the brazements.

The brazing operation for a headered tube-and-center heat exchanger is particularly complicated by the numerous brazements required for each tube, each of which must be brazed to both headers and its corresponding finned centers during a single brazing operation. To destroy and remove the aluminum oxide layer which is inherently present on the brazing stock material, and thus enhance the brazeability of the brazing and core alloys, the assembly or its individual components are generally sprayed with or dipped into a flux mixture composed of a water-insoluble flux material suspended in a liquid medium. For furnace brazing, more flux is required at the tube-to-header joint than the tube-to-fin joint so as to ensure that a fluid-tight seal is formed. In order to satisfy the flux requirements for both the tube-to-header and tube-to-fin joints, conventional flux mixtures typically consist of about 5 to about 25 volume percent of flux material suspended in water. The entire assembly is coated with the flux mixture and then dried to evaporate the water, leaving only the powdery flux material on the external surfaces of the assembly. Removal of the water is necessary so as to deter oxidation of the aluminum alloys during brazing, which would otherwise be detrimental to the brazeability of the heat exchanger. To further minimize the presence of moisture during brazing, the brazing atmosphere is typically composed of cryogenic nitrogen which is maintained at a dewpoint of no more than about $-43°$ C. ($-45°$ F.), with a free oxygen level of 100 parts per million (ppm) or less.

The basic form of flux material used in flux mixtures has been potassium fluoroaluminate complexes, consisting of a mixture of potassium aluminum fluoride ($K_3AlF_6$) and potassium tetrafluoroaluminate ($KAlF_4$), as disclosed in U.S. Pat. No. 3,951,328 to Wallace et al. and U.S. Pat. No. 3,971,501 to Cooke. These flux materials are molten at brazing temperatures, and upon cooling leave a residue forming a thin, uniform ceramic film. However, a shortcoming of these conventional flux mixtures is that, at brazing temperatures, potassium aluminum fluoride reacts with water inherently present in the potassium aluminum fluoride particles to form potassium fluoride (KF) and hydrogen fluoride (HF), both of which are extremely toxic and highly corrosive to the interior of the brazing furnace. The reaction is as follows:

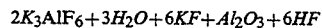

$$2K_3AlF_6 + 3H_2O + 6KF + Al_2O_3 + 6HF$$

Accordingly, the elimination of water vapor within the brazing furnace is an extremely important consideration when using a flux material which contains potassium aluminum fluoride. However, it is impossible to prevent the presence of water vapor during the brazing operation in that water is inherently present in the potassium aluminum fluoride particles. In addition, these flux materials must be suspended in water in order to be applied using spraying and dipping methods. Consequently, even after drying, additional moisture will be contributed to the brazing atmosphere. In addition, spraying and dipping methods result in the deposition of flux on surfaces of the heat exchanger components which do not serve as braze joint areas and thus do not require flux. The presence of this excess flux material further promotes the creation of the undesirable potassium fluoride and hydrogen fluoride.

Known methods by which aluminum alloy brazing stock materials are produced also contribute to the use and/or presence of excess flux. For example, stock materials are often formed by: forming the brazing alloy as a foil which is brazed to the aluminum alloy core; or coating the aluminum alloy core with a molten brazing alloy. As a result, two fluxing operations are required—the first to adhere the brazing alloy to the aluminum alloy core, and a second to braze the tubes to the headers and finned centers during the braze furnace operation. In addition to promoting the creation of a corrosive byproduct, the use of two fluxing operations is disadvantageous in that the application and removal of the excess flux material, as well as the necessary effluent control procedures required to treat the waste water generated by flux removal, add costs to the final assembly.

U.S. Pat. No. 5,180,098 to Halstead et al. teaches a concentrated flux mixture which allows the amount of flux mixture used to be reduced. In effect, the flux mixture also reduces the amount of potassium fluoride and hydrogen fluoride produced by minimizing the amount of flux mixture which must be used, and limiting the amount of water required in the flux mixture to suspend the flux material. However, as with most conventional flux mixtures, the flux mixture taught by Halstead et al. contains potassium fluoaluminate particles (i.e., both potassium aluminum fluoride and potassium tetrafluoroaluminate), as taught by U.S. Pat. No. 3,951,328 to Wallace et al. Accordingly, the flux mixture produces hydrogen fluoride and potassium fluoride as a corrosive byproducts due to the presence of potassium aluminum fluoride. Another disadvantage with known flux mixtures, including that taught by Halstead et al., is the tendency for the constituents of such mixtures to separate from suspension over time, typically in as little as 24 hours. Within less than a week, a hard residue forms at the bottom of the storage container which cannot be put back into suspension, rendering the flux mixture useless.

U.S. Pat. No. 5,251,374 to Halstead et al. teach a novel flux composition in which the flux material is a minimum of 96 percent potassium tetrafluoroaluminate, and is free of potassium aluminum fluoride. Consequently, such a flux composition does not produce hydrogen fluoride during brazing. However, the flux composition taught by Halstead et al. is susceptible to separating over time, which significantly limits the shelf life of the composition.

From the above, it is apparent that the brazing operation for a heat exchanger, and particularly a headered tube-and-center heat exchanger, is complicated by the numerous brazements which must be formed during a single brazing operation. Furthermore, conventional brazing operations undesirably make use of flux mixtures which, in an effort to suitably form the numerous required brazements, results in the presence of excess flux, and produce corrosive byproducts which shorten the service life of the brazing furnace. Finally, conventional flux mixtures have an extremely short shelf life, which further complicates the manufacture of brazed heat exchangers.

Accordingly, it would be desirable to provide a flux mixture which does not produce corrosive byproducts during the brazing operation, while also having an extended shelf life. In addition, it would be desirable if such a flux mixture made possible a method for forming a heat exchanger in which the amount of flux mixture required was significantly reduced, and in which the use of a clad brazing stock material alloy could be reduced or eliminated in order to further limit the use of the flux mixture in the manufacture of brazed heat exchangers.

SUMMARY OF THE INVENTION

It is an object of this invention to provide a flux composition for enhancing the brazeability of an aluminum alloy material, such as that used to form a brazed heat exchanger assembly.

It is another object of this invention that such a flux composition be formulated so as not to produce corrosive byproducts during the brazing operation.

It is yet another object of this invention that such a flux composition be characterized by an extended shelf life.

It is a further object of this invention that such a flux composition be in a concentrated form so as to minimize the amount of the flux composition required for the brazing operation.

It is yet a further object of this invention to provide a method for forming a brazed heat exchanger assembly in which the use of a clad brazing stock material for the components of the heat exchanger is minimized or eliminated through the use of a brazing alloy preform which can be selectively positioned at the braze joints.

In accordance with a preferred embodiment of this invention, these and other objects and advantages are accomplished as follows.

According to the present invention, there is provided an improved flux composition which is formulated for use in the brazing of aluminum alloy components, such as in the assembling of brazed heat exchanger units used in automotive applications. The flux composition is in a concentrated form, permitting its application directly to the joint surfaces of a heat exchanger's subcomponents. In addition, the flux composition is formulated so as to prevent formation of corrosive byproducts during the brazing operation, and is characterized by a significantly longer shelf life as compared to conventional flux compositions. Finally, the preferred flux composition makes possible a method for forming a brazed heat exchanger assembly, in which the use of a clad brazing stock material for the components of the heat exchanger can be minimized or eliminated through the use of a brazing alloy preform which can be selectively positioned at the braze joints.

The flux composition of this invention consists of a flux material which consists essentially of potassium tetrafluoroaluminate, a carrier system such as a glycerol-ethylene glycol system, a binder, and a liquid medium such as water. Most preferably, the potassium tetrafluoroaluminate constitutes at least about 96 percent of the flux material, with the balance substantially being water and naturally occurring trace elements. As a preferred aspect of this invention, the flux composition does not include potassium aluminum fluoride which is conventionally used as a flux material in the prior art, such that the flux composition does not react with moisture within the brazing atmosphere to produce any significant amounts of hydrogen fluoride or potassium fluoride during the brazing operation. As another preferred aspect of this invention, the binder is xanthan, and is present in an amount which is sufficient to substantially prevent the flux composition from separating from suspension during storage, so as to significantly extend the shelf life of the flux composition to well in excess of that known in the prior art.

The method of this invention is generally directed to the assembly of a headered tube-and-center type heat exchanger, and generally entails the use of a tube and header which are formed from suitable aluminum alloys. Prior to brazing, the flux composition of this invention and a ring formed of a suitable brazing alloy is placed at the joint formed by the tube and header such that, as the assembly is heated, the ring and flux composition will melt, brazing the tube to the header to form the heat exchanger. Because the ring provides the brazing alloy necessary for brazing, neither the tube nor the header need be formed from a clad braze stock material.

Because the braze joint between a finned center and a tube requires less of the concentrated flux composition of this invention, a finned center can be simultaneously brazed to the tube by applying a lower concentrated mixture of the flux composition to the finned center or the assembled heat exchanger prior to the brazing operation. A sufficient amount of the highly concentrated flux composition of this invention is then deposited at the tube-to-header joint. Consequently, a minimal amount of flux material is used in the brazing operation, yet a sufficient amount of flux material is present at the tube-to-header joint to deoxidize and wet the joining surfaces of the tube and header, such that the ring will flow and create fillets between the header and tube.

From the above, it can be seen that a significant advantage of this invention is that the flux composition does not include potassium aluminum fluoride as a constituent. As a result, the flux composition of this invention does not react to produce any significant amounts of hydrogen fluoride and potassium fluoride as a corrosive byproduct during the brazing operation. As such, the flux composition can be used in brazing operations which do not provide a controlled atmosphere, such as open torch brazing techniques. In addition, it has been discovered that the preferred binder advantageously extends the shelf life of the flux composition well in excess of that known in the prior art, generally on the order of several months. The concentrated form of the flux composition enables an assembly method in which a minimal amount of flux material can be used to produce the numerous brazements of a heat exchanger assembly. Finally, another advantage of this invention is that the use of a brazing alloy ring at the tube-to-header joint eliminates the requirement for the tube or header to be formed from a clad braze stock material.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings wherein.

DETAILED DESCRIPTION OF THE INVENTION

Figure 1:
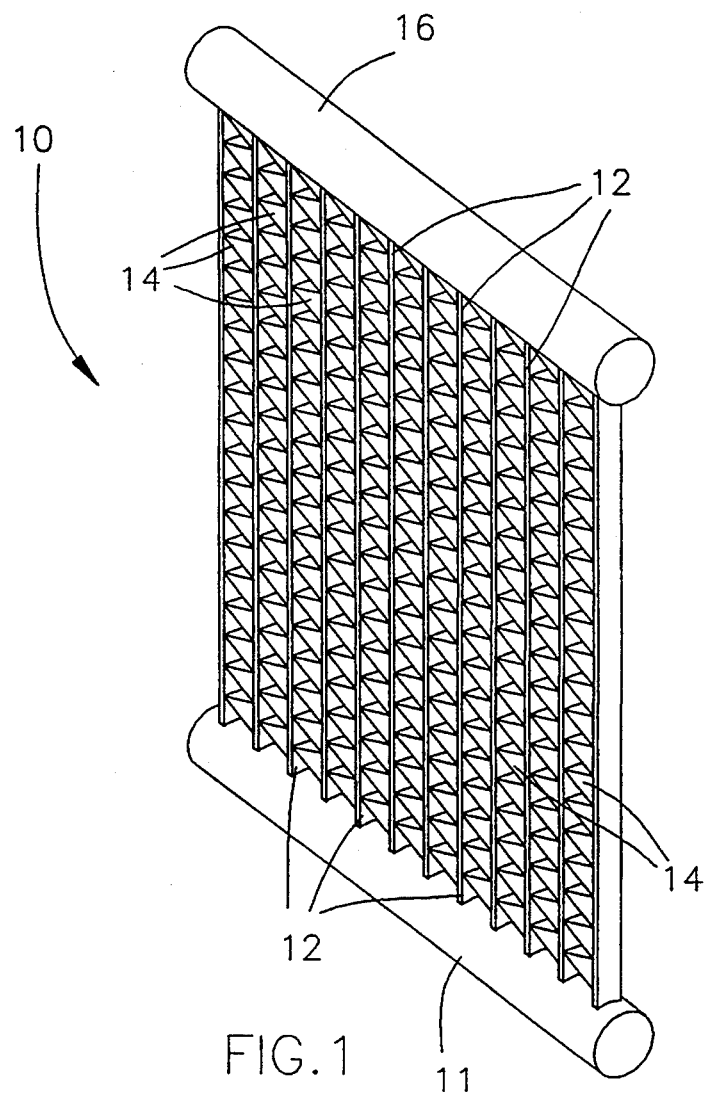
FIG. 1 illustrates a perspective view of a headered tube-and-center type heat exchanger unit.
Figure 2:
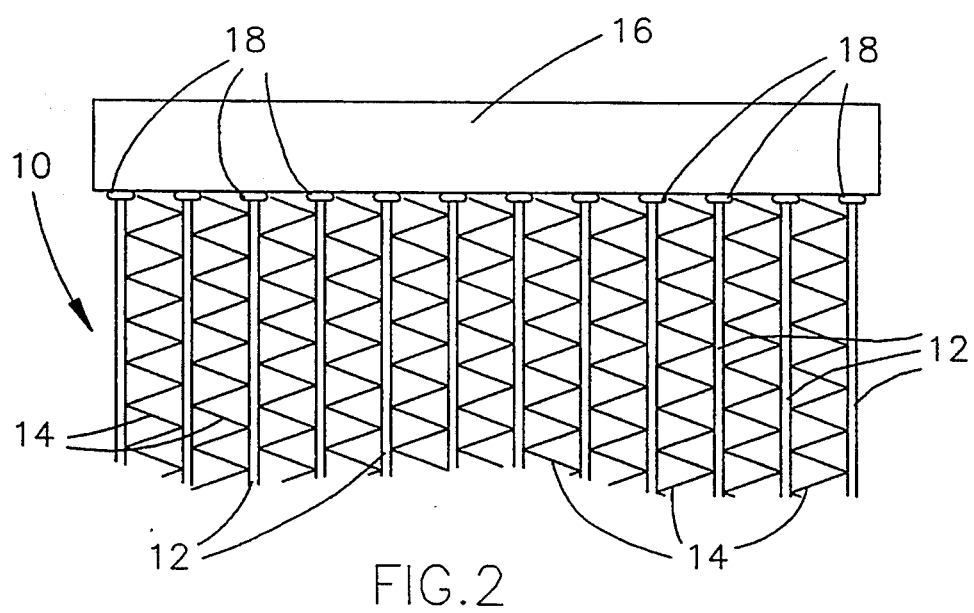
FIG. 2 is a frontal view of the heat exchanger of FIG. 1 showing the preferred placement of a flux composition in accordance with this invention.

Shown in FIGS. 1 and 2 is a headered tube-and-center type heat exchanger unit 10 which can be formed in accordance with this invention. The tube-and-center design is preferred for heat exchangers used in automotive applications such as air conditioning condensers, because the design maximizes the amount of surface area that is in contact with incoming air. The air is forced around the high surface area provided by finned centers 14 located between adjacent pairs of pipes or tubes 12, providing for a high heat exchange rate between the air and a suitable fluid which flows through the tubes 12. The tubes 12 are oriented to be geometrically in parallel with each other, as well as hydraulically in parallel, between a pair of tubular headers 16. The headers 16 are equipped with an inlet and outlet (not shown) through which a suitable coolant is delivered to and from the heat exchanger 10. As is conventional, the headers 16 define reservoir tanks which may be partitioned such that the tubes 12 and headers 16 form a continuous and circuitous fluidic path through the heat exchanger 10 for the coolant. While the above type of heat exchanger is particularly suited for the teachings of the present invention, numerous variations on the structure shown in FIGS. 1 and 2 are known in the art, with numerous additional variations being foreseeable. Accordingly, the teachings of this invention are not to be construed as being limited to the heat exchanger 10 shown in the figures.

Shown in greater detail in FIG. 2 is a view of the heat exchanger 10 prior to brazing, which serves to illustrate the preferred placement of the flux composition of this invention. The region depicted shows a number of tubes 12 received within apertures formed in one of the headers 16, with a number of finned centers 14 being positioned between each adjacent pair of tubes 12. Each header 16 is formed from an aluminum alloy material, such as aluminum alloy AA 3003, as designated by the Aluminum Association (AA), though other similar aluminum alloys could also be employed. The tubes 12 are also preferably formed from an aluminum alloy, such as AA 3003. Generally speaking, aluminum alloy AA 3003 has been found to perform satisfactorily and can be easily formed to produce the headers 16 and tubes 12, as well as the finned centers 14. In addition, there are no inherent brazing difficulties associated with the use of this particular alloy, and the structural integrity of the material during use has generally been found to be sufficient. In accordance with the teachings of this invention, the headers 16 and tubes 12 need not be formed from an aluminum alloy core material which is clad with a brazing alloy, in that a brazing alloy preform is preferably used as will be explained below. The finned centers 14 are preferably formed with a clad braze stock material, such as AA 3003 which has been clad with an aluminum-silicon eutectic brazing alloy, such as AA 4045, AA 4047 and AA 4343.

Represented in FIG. 2 by reference numeral 18, a predetermined amount of the flux composition of this invention is shown as being deposited around each tube 12 at the tube-to-header joint prior to the brazing operation for the heat exchanger 10. The flux composition is applied to the external surfaces of the headers 16 to promote the external formation of braze fillets between the headers 16 and the tubes 12 during the subsequent brazing operation. In addition, a light coating of the flux composition is also applied to the finned centers 14 so as to promote the external formation of braze fillets between the finned centers 14 and the tubes 12.

In accordance with this invention, the flux composition is formulated to contain a flux material which will not react to produce any significant amounts of hydrogen fluoride and potassium fluoride during the brazing operation, and a binder which will significantly extend the shelf life of the flux composition beyond that of the prior art. More specifically, the flux material is limited to potassium tetrafluoroaluminate (KAlF$_4$) which, after brazing and upon solidification, forms a non-corrosive, glassy, ceramic residue which does not impair the operation of the heat exchanger 10. The flux material is present within the flux composition within the preferred range of from about 25 to about 62 weight percent, depending on where and how the flux composition is to be applied. Within this range, the amount of flux material present can alter the viscosity of the flux composition from a Zahn Cup #3 reading of about 26 to about 40, to a Zahn Cup #4 reading of about 125 to about 180.

As a preferred feature of this invention, the flux material preferably has a purity of at least 96 percent (i.e., at least 96 percent potassium tetrafluoroaluminate), with the balance being water and trace elements. As such, the melting point of the flux material is about 550° C. (1028° F.). The use of such a pure form of potassium tetrafluoroaluminate is completely contrary to the teachings of the prior art which generally teach the use of potassium fluoaluminate complexes, indicating the presence of both potassium aluminum fluoride and potassium tetrafluoroaluminate. Most preferably, the particle size of the potassium tetrafluoroaluminate should be no greater than about 80 micrometers to promote smooth application of the flux composition.

The binder is preferably xanthan, a synthetic, water-soluble bipolymer which is sufficiently volatile at elevated temperatures so as to burn-off completely during the brazing operation. In accordance with this invention, the presence of about 0.4 to about 10 grams of xanthan per liter of flux composition has been determined to significantly reduce the tendency for the flux composition to separate, yielding a flux composition which has a shelf life of at least several months. Though xanthan is the preferred binder of this invention, it is foreseeable that one skilled in the art could substitute other binder materials having similar physical and chemical properties and achieve satisfactory results.

In addition, the flux composition of this invention includes a carrier system and a liquid medium in which the flux material is suspended. Most preferably, the carrier system is composed of glycerin and ethylene glycol in amounts sufficient to yield a flux composition composed of about 6 to about 14 weight percent glycerin and about 40 to about 62 weight percent ethylene glycol. The use of a glycerin-ethylene glycol carrier system results in a flux composition having a sufficiently high viscosity so as to enable the flux composition to be accurately applied to selected surfaces of the heat exchanger 10. Lastly, the liquid medium is preferably water, which is employed in sufficient amounts to adjust the viscosity of the flux composition for processing and deposition. Generally, the inclusion of water within a range of about 2 to about 6 weight percent is suitable. As is conventional, the water is evaporated prior to the brazing operation in order to avoid oxidation of the aluminum alloys during brazing.

In accordance with the above-stated ranges, a five gallon (19.2 liters) batch of the preferred flux composition can be made by adding to about 1,177 liters of water at about 70° to about 80° C.: about 11,770 liters ethylene glycol; about 1,177 liters glycerol; about 10,432 grams potassium tetrafluoroaluminate; and about nine grams xanthan. The equivalent volume percent of potassium tetrafluoroaluminate in the above flux composition is about 50 percent, which results in a relatively viscous consistency having a Zahn Cup #4 reading of about 125 to about 180. Consequently, the flux composition can be accurately applied to the tube-to-header joint of the heat exchanger 10, and will remain adhered to the heat exchanger 10 during handling. Generally, for the tube-to-fin joints, a less concentrated flux composition can be suitably used, on the order of about 25 to about 33 weight percent (about 4 to about 10 volume percent) flux material. At this level, the viscosity of the flux composition has a Zahn Cup #3 reading of about 26 to about 40, which is sufficiently low to allow the flux composition to be applied using conventional spraying or dipping methods. As a result, the more highly concentrated flux composition can be selectively deposited at the tube-to-header joints, while the lower concentrated flux composition can be applied to the finned centers 14 or over the entire surface of the heat exchanger 10. As such, the overall amount of the flux material used for brazing such an assembly is reduced by over 50 percent as compared to the prior art.

The precise amount of flux composition used may vary considerably depending on the size of the heat exchanger 10 and its individual components. Generally, the amount of the flux composition deposited at the tube-to-header joint must be sufficient to deoxidize and wet the joint surfaces of the headers 16, tubes 12 and finned centers 14. In practice, a preferred amount has been determined to be about 0.5 to about 2 grams per tube 12 for the tube-to-header joints. As is conventional in the art, once the flux composition of this invention has been appropriately applied to the tubes 12, headers 16 and finned centers 14 of the heat exchanger 10, the water in the flux composition is evaporated by heating the heat exchanger 10 to a temperature of up to about 370° C. The furnace brazing operation is then performed at a temperature of about 602° C. to about 606° C. for a duration which is sufficient to melt the flux material and the brazing alloy layer of the braze stock material. Once melted, the flux material removes the oxide ordinarily present on the exposed aluminum surfaces, promotes flow of the molten brazing alloy, and inhibits further oxide formation. Most preferably, and as generally practiced in the prior art, the brazing furnace maintains an atmosphere of high purity cryogenic nitrogen with a dewpoint of at most about −40° C. (−40° F.) and free oxygen at 100 ppm or less. Upon cooling, the molten brazing alloy solidifies to form the numerous brazements which seal the joints and bond the components together. The result is a leak-free, structurally-sound joint between each of the components, resulting in a monolithic brazed heat exchanger such as that illustrated in FIGS. 1 and 2.

Figure 3:
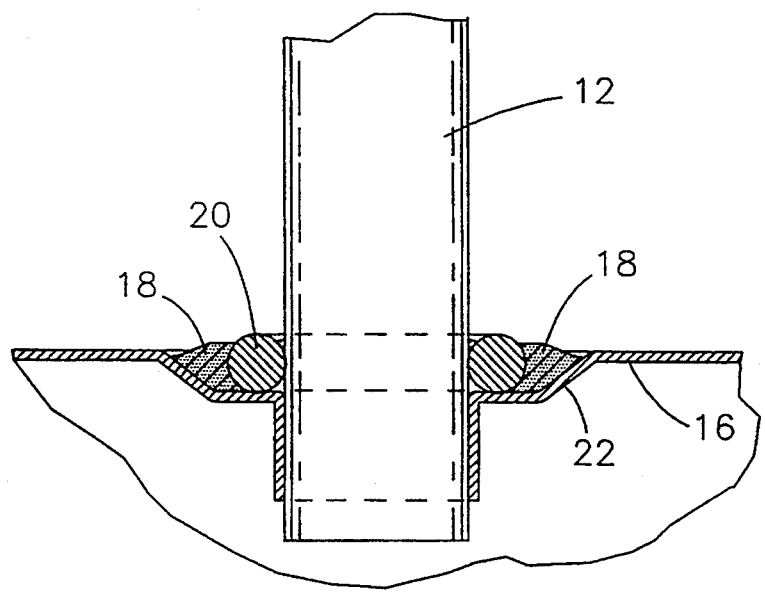
FIG. 3 is a partial cross-sectional view of a tube-to-header joint of the heat exchanger of FIG. 1 prior to brazing.
Figure 4:
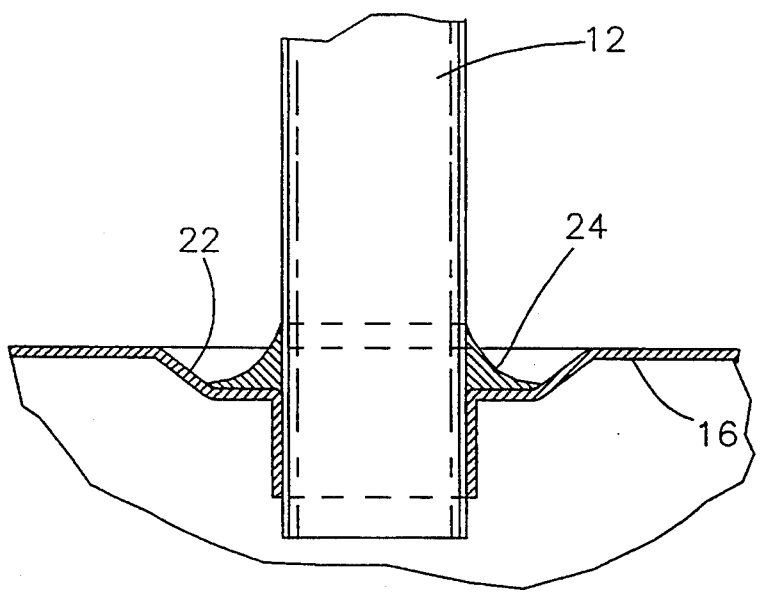
FIG. 4 is a partial cross-sectional view of the tube-to-header joint of FIG. 3 after brazing.

In addition to furnace brazing operations, the concentrated flux composition of this invention is also highly suitable for use in open torch brazing methods. As shown in FIGS. 3 and 4, the open torch brazing method of this invention is achieved with the use of a braze ring 20 which is positioned around one end of a tube 12. The braze ring 20 is preferably an aluminum-silicon alloy, such as AA 4045, 4047, 4145 and 4343, which are each characterized by having a melting point which is less than the preferred AA 3003 alloy used for the headers 16. Advantageously, with the use of the braze ring 20, it is unnecessary to form the headers 16 or tubes 12 from a braze stock material—i.e., an aluminum core alloy which has been clad with an aluminum-based brazing alloy. A depression or well 22 is formed in the header 16 so as to circumscribe each aperture through which a tube 12 is inserted into the header 16. When the tube 12 and header 16 are assembled, the braze ring 20 nests within the well 22 as shown in FIG. 3. The flux composition 18 of this invention is then selectively deposited in the well 22, such that the well 22 serves as a reservoir for the flux composition before and during brazing. FIG. 4 illustrates the appearance of the tube-to-header joint after being heated in a known manner by an open torch, which may be fueled by propane, natural gas, oxygen plus natural gas, or the like. Heating by an induction coil can also be used, as is also known in the art.

From the above, it can be seen that a particularly advantageous feature of this invention is that the concentrated flux composition is composed of at least 96 percent potassium tetrafluoroaluminate, and does not include potassium aluminum fluoride as a constituent. As a result, the flux composition of this invention does not react to produce any significant amounts of hydrogen fluoride and potassium fluoride as a corrosive by-product during the brazing operation. In addition, the use of xanthan as a binder for the flux composition serves to advantageously extend the shelf life of the flux composition well in excess of that known in the prior art, generally on the order of several months. In particular, xanthan has been found to substantially prevent separation of the flux composition, which would otherwise result in the formation of a hard residue which cannot be placed back into suspension.

Furthermore, the concentrated form of the flux composition enables an assembly method in which a minimal amount of flux material can be used to produce the numerous brazements of a heat exchanger assembly. In particular, the flux composition can be selectively deposited at each tube-to-header joint in order to provide the extra fluxing strength required at these joints, as compared to the tube-to-fin joints. Such an approach is particularly compatible with the use of a braze ring at the tube-to-header joint, which eliminates the requirement for the tube or header to be formed from a clad braze stock material. The brazing methods made possible by the flux composition of this invention are also advantageous in that the amount of flux composition required is significantly reduced because of the selective placement of the flux composition at the intended braze joints, thereby lowering furnace maintenance and increasing furnace life.

While our invention has been described in terms of a preferred embodiment, it is apparent that other forms could be adopted by one skilled in the art, such as by modifying the preferred quantity of the individual constituents of the flux composition, or by modifying the processing steps or heat exchanger design employed. Accordingly, the scope of our invention is to be limited only by the following claims.

The embodiments of the invention in which an exclusive property or privilege is claimed are defined as follows:

1. A flux composition comprising:
   a flux material consisting essentially of potassium tetrafluoroaluminate;
   a carrier system;
   a binder present in an amount which is sufficient to substantially prevent the flux composition from separating from suspension; and
   a liquid medium.

2. A flux composition as recited in claim 1 wherein the carrier system comprises a glycerol-ethylene glycol carrier system.

3. A flux composition as recited in claim 1 wherein the potassium tetrafluoroaluminate constitutes at least about 96 percent of the flux material.

4. A flux composition as recited in claim 1 wherein the liquid medium comprises water.

5. A flux composition as recited in claim 1 wherein the binder comprises xanthan.

6. A flux composition as recited in claim 1 wherein the binder is present in the flux composition in an amount of about 0.4 to about 10 grams per liter of the flux composition.

7. A flux composition comprising:
   a flux material comprising at least about 96 percent potassium tetrafluoroaluminate;
   ethylene glycol;
   glycerol;
   a binder present in an amount which is sufficient to substantially prevent the flux composition from separating from suspension during storage; and
   water;
   wherein the flux composition does not produce hydrogen fluoride and potassium fluoride when heated during a brazing operation.

8. A flux composition as recited in claim 7 wherein the flux composition comprises:
   about 25 to about 62 weight percent of the flux material;
   about 40 to about 62 weight percent of the ethylene glycol;
   about 6 to about 14 weight percent of the glycerol; and
   about 2 to about 6 weight percent of the water.

9. A flux composition as recited in claim 7 wherein the binder comprises xanthan.

10. A flux composition as recited in claim 7 wherein the binder is present in the flux composition in an amount of about 0.4 to about 10 grams per liter of the flux composition.

11. A method for forming a heat exchanger having at least one tube extending from a header, the method comprising the steps of:
   forming the tube and header from aluminum alloys, the header and tube have corresponding surfaces which serve as joining surfaces therebetween, the joining surface of the header having a depression formed therein;
   assembling the tube and header so as to form an assembly in which a braze ring circumscribes the tube so as to reside in the depression formed in the joining surface of the header, and with a flux composition being present in the depression, wherein the flux composition comprises:
   a flux material consisting essentially of potassium tetrafluoroaluminate;

a carrier system;

a binder present in an amount which is sufficient to substantially prevent the flux composition from separating from suspension; and a liquid medium; and heating the assembly for a duration which is sufficient to melt the braze ring and the flux composition so as to braze the tube to the header to form the heat exchanger.

12. A method as recited in claim 11 wherein the carrier system comprises a glycerol-ethylene glycol carrier system.

13. A method as recited in claim 11 wherein the potassium tetrafluoroaluminate constitutes at least about 96 percent of the flux material.

14. A method as recited in claim 11 wherein the liquid medium comprises water.

15. A method as recited in claim 11 wherein the binder comprises xanthan.

16. A method as recited in claim 11 wherein the flux composition consists essentially of the flux material, ethylene glycol, glycerol, xanthan, and water.

17. A method as recited in claim 11 wherein the flux composition consists essentially of:

about 25 to about 62 weight percent of the flux material;

about 40 to about 62 weight percent ethylene glycol;

about 6 to about 14 weight percent glycerol;

about 0.4 to about 10 grams of xanthan per liter of the flux composition; and about 2 to about 6 weight percent water.

18. A method as recited in claim 11 further comprising the steps of:

formulating a second flux composition comprising the flux material, the carrier system, the binder, and the liquid medium, wherein the concentration of the flux material in the second flux composition is less than that of the flux composition utilized in the assembly step;

positioning a finned center beside the tube; and depositing a film of the second flux composition on the tube and the finned center prior to the heating step.

19. A method as recited in claim 18 wherein the binder of the second flux composition comprises xanthan.

20. A method as recited in claim 18 wherein potassium tetrafluoroaluminate constitutes at least about 96 percent of the flux material of the second flux composition.

* * * * *